United States Patent
Park et al.

(10) Patent No.: US 11,240,762 B2
(45) Date of Patent: Feb. 1, 2022

(54) UPLINK TRANSMIT POWER CONTROL FOR CROSS LINK INTERFERENCE

(71) Applicant: LG ELECTRONICS INC., Seoul (KR)

(72) Inventors: Jongkeun Park, Seoul (KR); Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 16/870,232

(22) Filed: May 8, 2020

(65) Prior Publication Data

US 2020/0359331 A1  Nov. 12, 2020

(30) Foreign Application Priority Data

May 10, 2019  (KR) ........................ 10-2019-0054850

(51) Int. Cl.
| | |
|---|---|
| *H04W 52/08* | (2009.01) |
| *H04W 52/14* | (2009.01) |
| *H04W 52/24* | (2009.01) |
| *H04W 72/04* | (2009.01) |
| *H04W 24/10* | (2009.01) |
| *H04W 76/27* | (2018.01) |
| *H04W 8/24* | (2009.01) |

(52) U.S. Cl.
CPC ........... *H04W 52/146* (2013.01); *H04W 8/24* (2013.01); *H04W 24/10* (2013.01); *H04W 52/243* (2013.01); *H04W 72/042* (2013.01); *H04W 76/27* (2018.02)

(58) Field of Classification Search
CPC ............. H04W 92/20; H04W 72/1231; H04W 52/146; H04W 72/0426; H04W 52/08; H04W 72/085; H04B 17/336; H04B 17/24
See application file for complete search history.

(56) References Cited

U.S. PATENT DOCUMENTS

| | | | |
|---|---|---|---|
| 2013/0324182 A1* | 12/2013 | Deng | .................. H04W 52/383 455/522 |
| 2020/0351797 A1* | 11/2020 | Frank | .................... H04L 5/0044 |
| 2021/0227475 A1* | 7/2021 | Tang | ..................... H04W 52/16 |

* cited by examiner

*Primary Examiner* — Tu X Nguyen
(74) *Attorney, Agent, or Firm* — Dentons US LLP

(57) ABSTRACT

There is provided a method for determining an uplink transmit power. The method may be performed by a user equipment (UE) and comprise: receiving information on an additional reduction value for an uplink transmission power and determining the uplink transmit power based on the additional reduction value. The additional reduction value may be used to reduce a cross link interference (CLI). The uplink transmit power may be determined within a lower bound and an upper bound. Based on that the uplink transmission may be performed in a frequency range 1 (FR1) for 5G, the additional reduction value is applied to one or both of the lower bound and the upper bound.

12 Claims, 15 Drawing Sheets

UPLINK TRANSMIT POWER CONTROL FOR CROSS LINK INTERFERENCE

CROSS-REFERENCE TO RELATED APPLICATIONS

Pursuant to 35 U.S.C. § 119 (e), this application claims the benefit of Korean Patent Application No. 10-2019-0054850, filed on May 10, 2019, the contents of which are all hereby incorporated by reference herein in their entirety.

TECHNICAL FIELD

The present disclosure relates to mobile communication.

BACKGROUND

With the success in the Evolved Universal Terrestrial Radio Access Network (E-UTRAN) for 4th generation mobile communication, i.e., long term evolution (LTE)/LTE-Advanced (LTE-A), interest in the next-generation, i.e., 5th generation (also known as 5G) mobile communication is rising, and extensive research and development are in process.

A new radio access technology (New RAT or NR) is being researched for the 5th generation (also known as 5G) mobile communication.

A frequency band for NR may be defined as two types (FR1 and FR2) of frequency ranges. FR1 may include a range from 410 MHz to 7125 MHz. That is, FR1 may include a frequency band of 6 GHz or greater (or 5850, 5900, 5925 MHz, or the like). For the convenience of description, FR1 may refer to a "sub-6-GHz range", FR2 may refer to an "above-6-GHz range" and may be referred to as a millimeter wave (mmWave).

In 5G NR networks, Time Division Duplex (TDD) and Frequency Division Duplex (FDD) can be used in the range of operation band FR1 (e.g., 6 GHz or lower) and TDD can be used in the range of operation band FR2 (e.g., 6 GHz or higher).

In the case of TDD, a ratio of DL to UL can be set differently by changing a DL/UL configuration in response to the amount of traffic. However, such a dynamic change of DL/UL ratio increases a cross link interference (CLI).

To reduce the CLI, each cell has to take amount of CLI into consideration to flexibly change a UL/DL ratio. That is, in order to flexibly change a UL/DL configuration, techniques for mitigating interference caused by a difference between a UL/DL configuration of a serving cell and a UL/DL configuration of a neighboring cell are required.

SUMMARY

Accordingly, a disclosure of the specification has been made in an effort to solve the aforementioned problem.

In accordance with an embodiment of the present disclosure, a disclosure of this specification provides a method for determining an uplink transmit power. The method may be performed by a user equipment (UE) and comprise: receiving information on an additional reduction value for an uplink transmission power and determining the uplink transmit power based on the additional reduction value. The additional reduction value may be used to reduce a cross link interference (CLI). The uplink transmit power may be determined within a lower bound and an upper bound. Based on that the uplink transmission may be performed in a frequency range 1 (FR1) for 5G, the additional reduction value is applied to one or both of the lower bound and the upper bound.

The method may further comprise: transmitting capability information representing whether the UE is capable of applying the additional reduction value to determine the uplink transmit power.

The method may further comprise: measuring the CLI which is caused by adjacent UEs served by a neighboring cell; and transmitting a measurement report including information on the measured CLI.

The information on the additional reduction value may be received via a radio resource control (RRC) signal or downlink control information (DCI).

In accordance with an embodiment of the present disclosure, a disclosure of this specification provides a method for controlling an uplink transmit power. The method may be performed by a base station and comprise: transmitting, to a user equipment (UE), information on an additional reduction value for an uplink transmission power of the UE. The additional reduction value may be used for the UE to determine the uplink transmit power thereby reducing a cross link interference (CLI). The uplink transmit power may be within a lower bound and an upper bound. Based on that the uplink transmission is performed in a frequency range 1 (FR1) for 5G, the additional reduction value may be applied to one or both of the lower bound and the upper bound.

The method may further comprise: receiving capability information representing whether the UE is capable of applying the additional reduction value to determine the uplink transmit power.

The method may further comprise: receiving information on a CLI from a neighboring cell and determining the additional reduction value, based on the information on the CLI.

The information on the additional reduction value may be transmitted via a radio resource control (RRC) signal or downlink control information (DCI).

In accordance with an embodiment of the present disclosure, a disclosure of this specification provides a user equipment (UE) for determining an uplink transmit power. The UE may comprise: at least one processor; and at least one computer memory operably connectable to the at least one processor and storing instructions that, when executed by the at least one processor, perform operations comprising: receiving information on an additional reduction value for an uplink transmission power; and determining the uplink transmit power based on the additional reduction value. The additional reduction value may be used to reduce a cross link interference (CLI). The uplink transmit power may be determined within a lower bound and an upper bound. Based on that the uplink transmission may be performed in a frequency range 1 (FR1) for 5G, the additional reduction value is applied to one or both of the lower bound and the upper bound.

According to a disclosure of the present disclosure, the above problem of the related art is solved.

With the disclosure of the present disclosure, it is possible to dynamically change a ratio and an order of UL/DL in TDD by setting the transmission power of the UE.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those

DETAILED DESCRIPTION OF THE EMBODIMENTS

Figure 1:
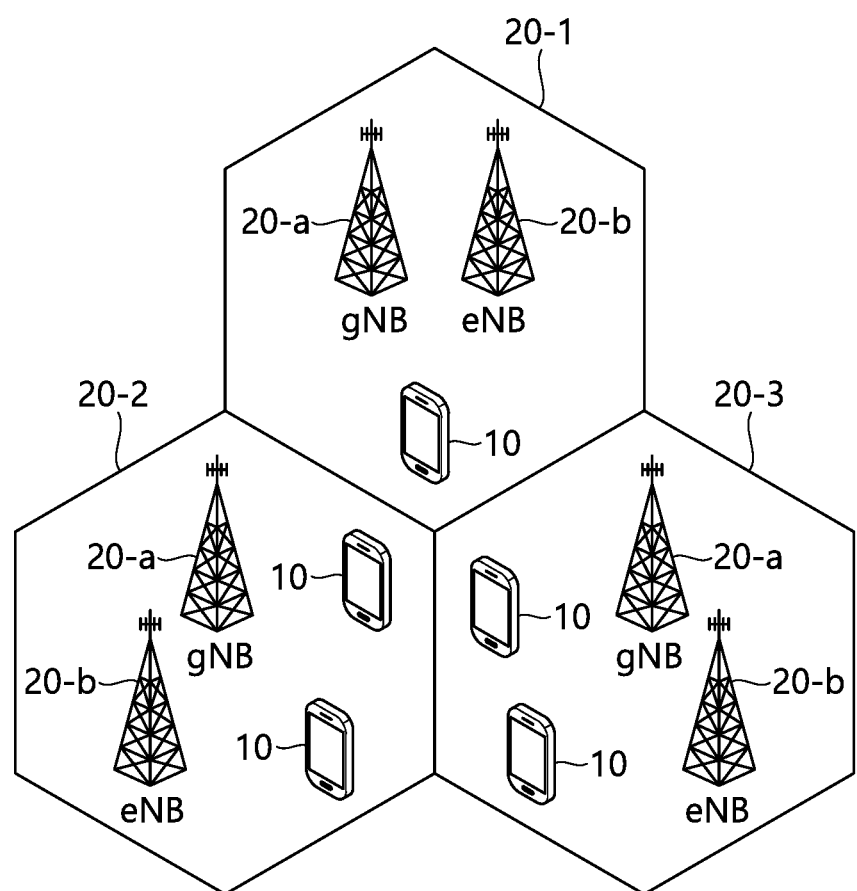
FIG. 1 illustrates a wireless communication system.

Hereinafter, based on 3rd Generation Partnership Project (3GPP) long term evolution (LTE), 3GPP LTE-advanced (LTE-A), 3GPP 5G (5th generation) or 3GPP New Radio (NR), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Although the present disclosure has been described based on a Universal Mobile Telecommunication System (UMTS), an Evolved Packet Core (EPC), and a next generation (also known as 5th generation or 5G) mobile communication network, the present disclosure will be limited only to the aforementioned communication systems and may, therefore, be applied to all communication system and methods to which the technical scope and spirit of the present disclosure can be applied.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

As used herein, 'base station' generally refers to a fixed station that communicates with a wireless device and may be denoted by other terms such as eNB (evolved-NodeB), BTS (base transceiver system), gNB (next-generation NodeB), or access point.

As used herein, 'user equipment (UE)' may be an example of a wireless communication device such as stationary or mobile. Also, UE may be denoted by other terms such as device, wireless device, terminal, MS (mobile station), UT (user terminal), SS (subscriber station), MT (mobile terminal) and etc.

<Next-Generation Mobile Communication Network>

The following description of this specification may be applied to a next-generation (also known as 5th generation or 5G) mobile communication network.

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2300.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

FIG. 1 illustrates a wireless communication system.

As seen with reference to FIG. 1, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A.

Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once a radio resource control (RRC) connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 2A:
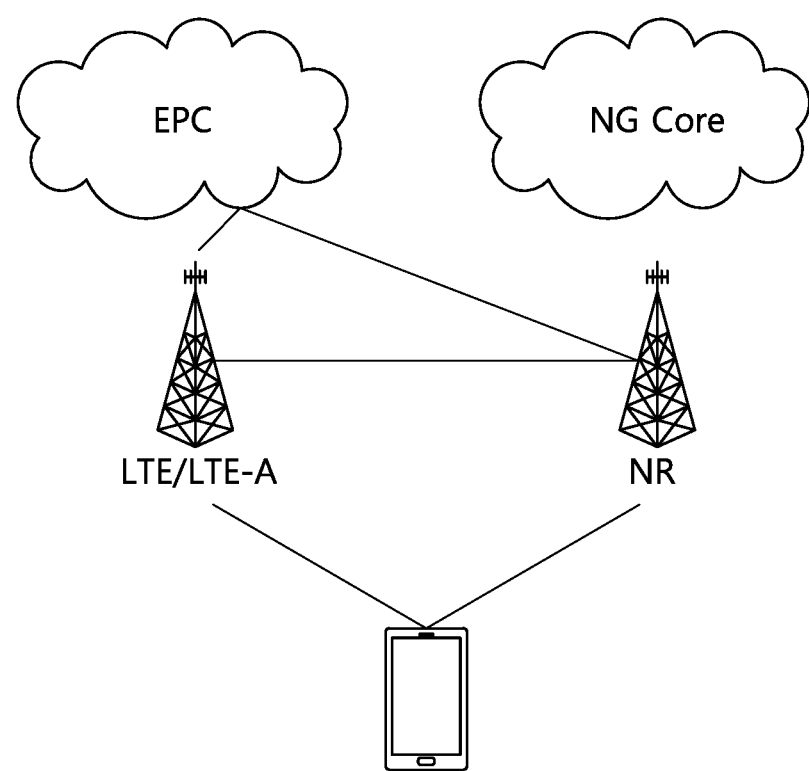
FIGS. 2a to 2c are exemplary diagrams illustrating exemplary architectures for services of the next generation mobile communication.
Figure 2B:
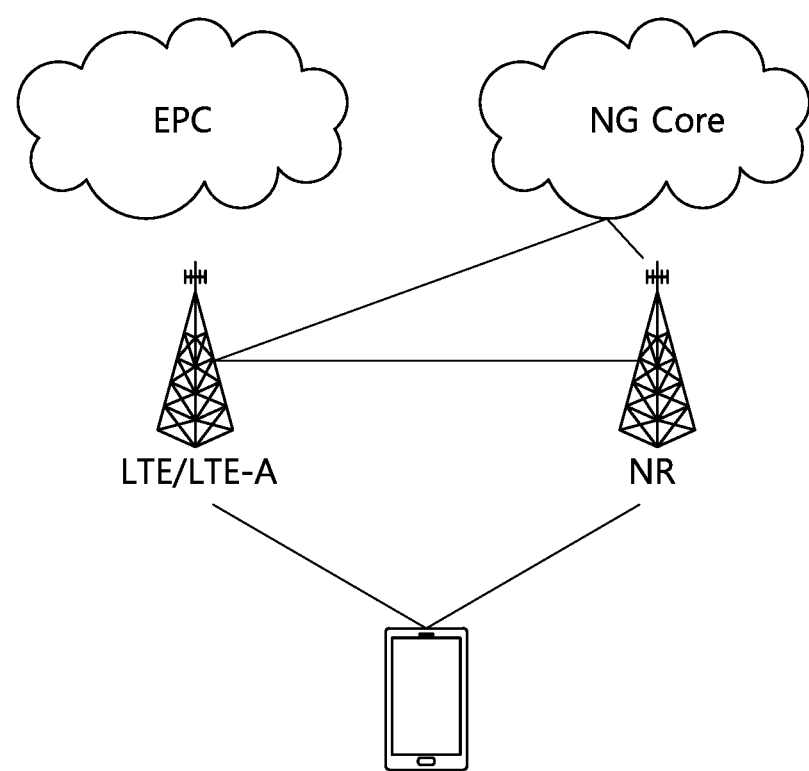
Figure 2C:
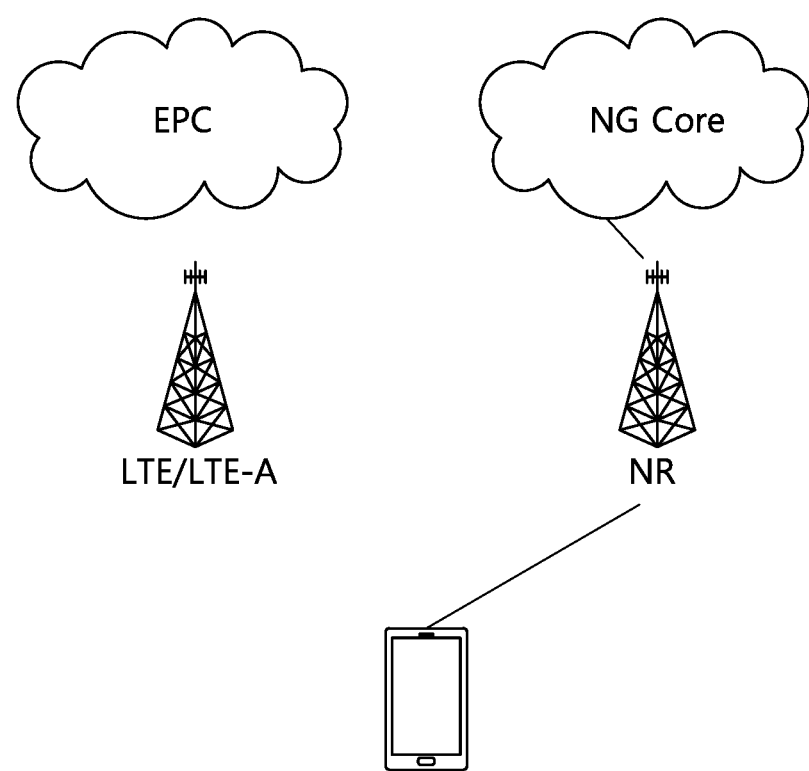

FIGS. 2*a* to 2*c* are exemplary diagrams illustrating exemplary architectures for services of the next generation mobile communication.

Referring to FIG. 2*a*, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2*b*, unlike FIG. 2*a*, the LTE/LTE-A based cell is connected to a core network for the 5G mobile communication, that is, a next generation (NG) core network.

The service scheme based on the architecture as illustrated in FIGS. 2*a* and 2B is called non-standalone (NSA).

Referring to FIG. 2*c*, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 1

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 2. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Operating Band in NR>

An operating band in NR is as follows.

Table 3 shows examples of operating bands on FR1. Operating bands shown in Table 3 is a reframing operating band that is transitioned from an operating band of LTE/LTE-A. This operating band may be referred to as FR1 operating band.

TABLE 3

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | PM |
| n2 | 1850 MHz-1910 MHz | 1930 MHz-1990 MHz | PM |
| n3 | 1710 MHz-1785 MHz | 1805 MHz-1880 MHz | PM |
| n5 | 824 MHz-849 MHz | 869 MHz-894 MHz | PM |
| n7 | 2500 MHz-2570 MHz | 2620 MHz-2690 MHz | PM |
| n8 | 880 MHz-915 MHz | 925 MHz-960 MHz | PM |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2300 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |

TABLE 3-continued

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 4 shows examples of operating bands on FR2. The following table shows operating bands defined on a high frequency. This operating band is referred to as FR2 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

Meanwhile, when the operating band shown in the above table is used, a channel bandwidth is used as shown in the following table.

TABLE 5

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, $N_{RB}$ indicates the number of RBs.

Meanwhile, when the operating band shown in the above table is used, a channel bandwidth is used as shown in the following table.

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

Figure 3:
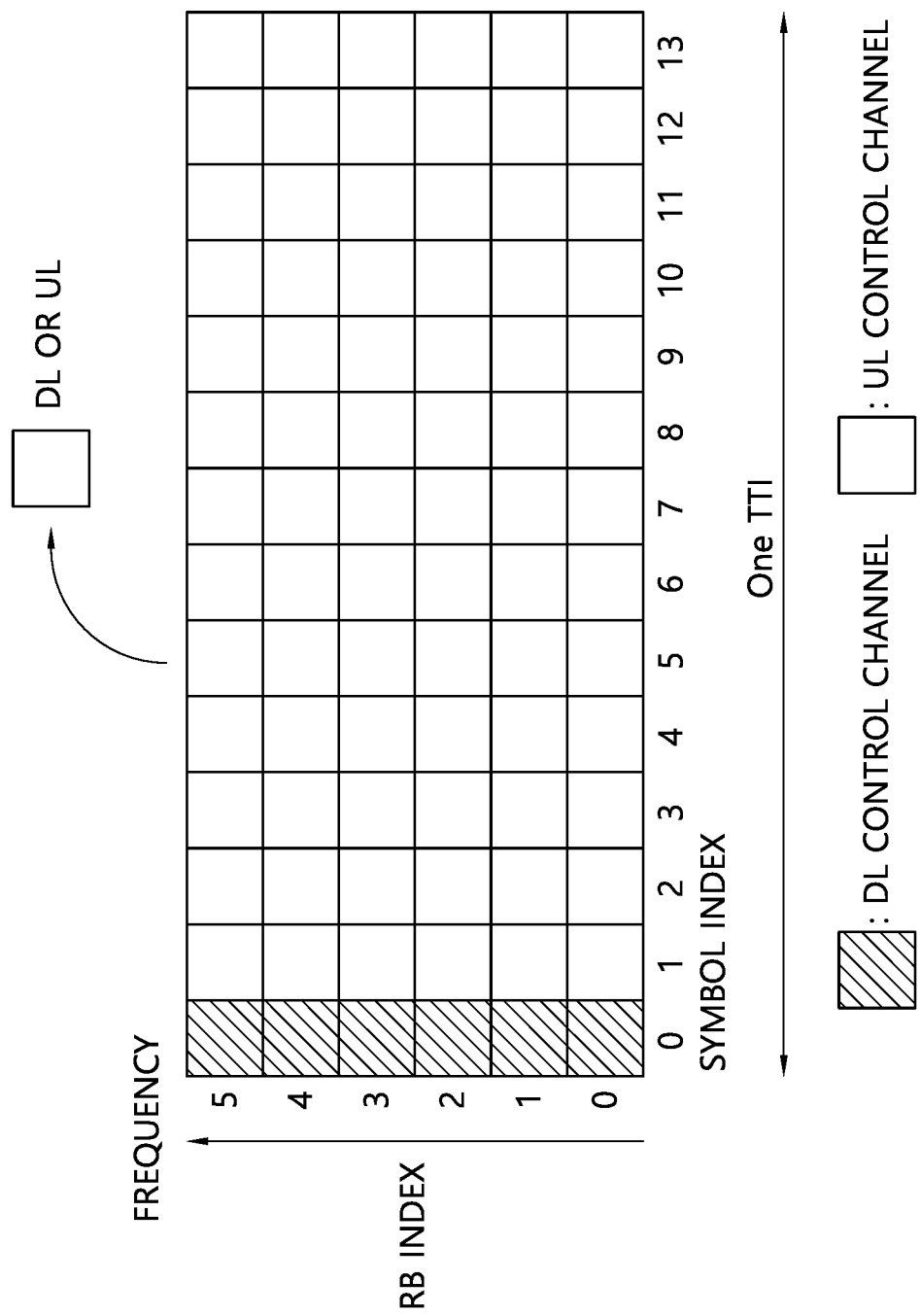
FIG. 3 shows an example of subframe type in NR.

FIG. 3 shows an example of subframe type in NR.

Figure 4:
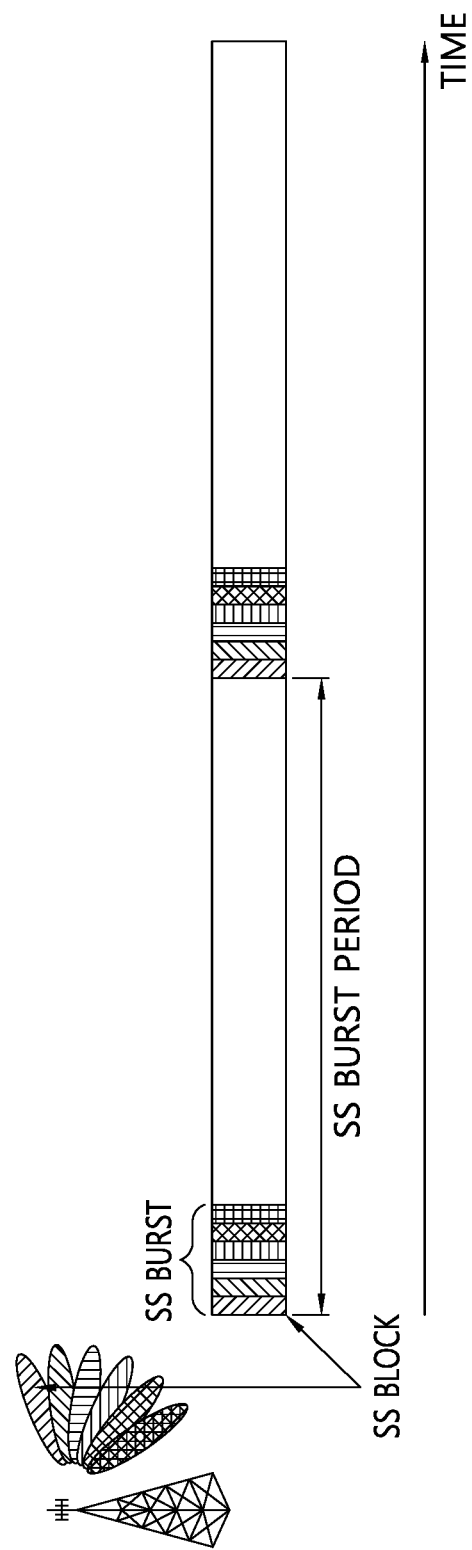
FIG. 4 is an exemplary diagram illustrating an example of an SS block in NR.
Figure 5:
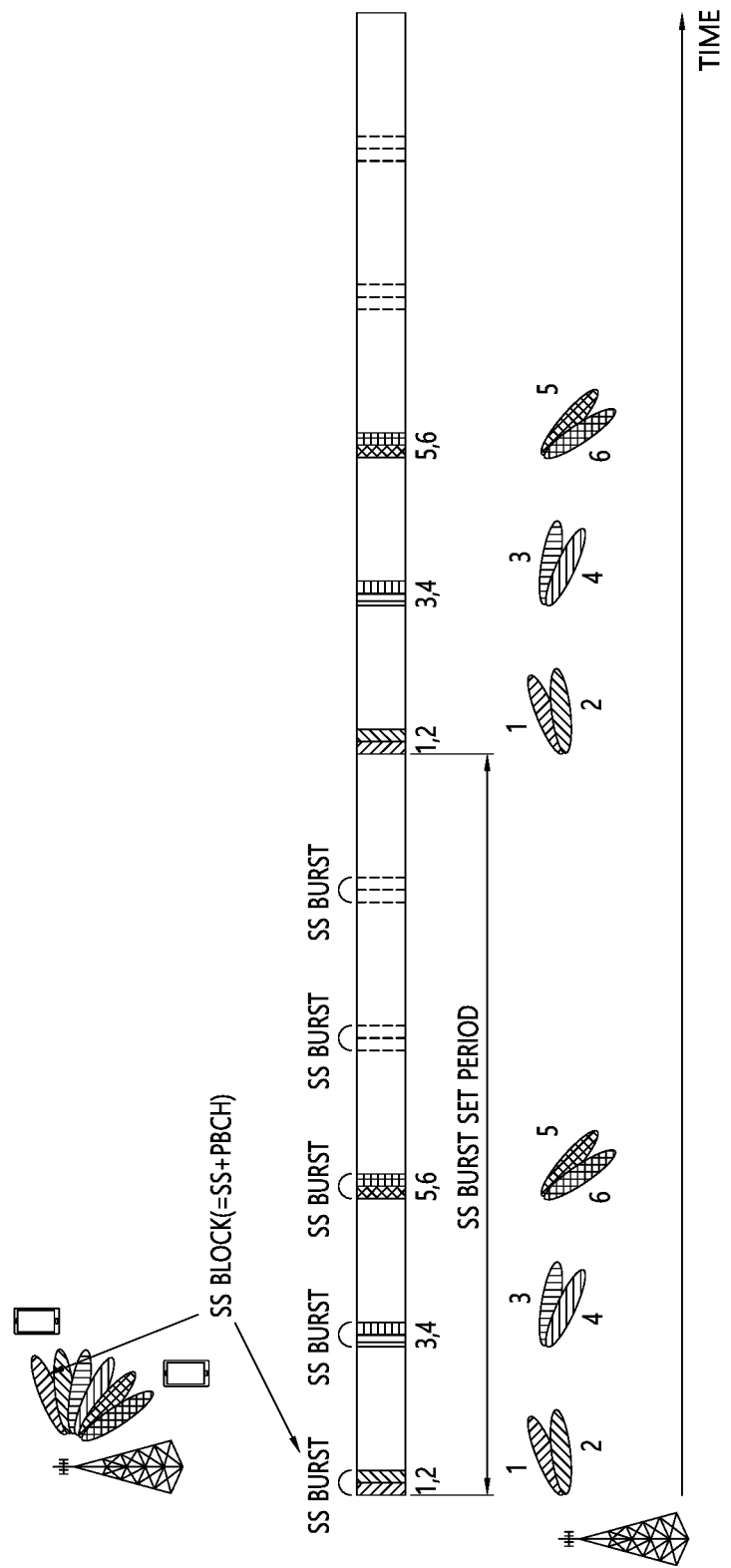
FIG. 5 is an exemplary diagram illustrating an example of beam sweeping in NR.

A transmission time interval (TT) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), down-link transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 7

| M | $\Delta f = 2^{\mu} \cdot 15$ [kHz] | CP |
|---|---|---|
| 0 | 15 | Normal |
| 1 | 30 | Normal |

TABLE 7-continued

| M | $\Delta f = 2^{\mu} \cdot 15$ [kHz] | CP |
|---|---|---|
| 2 | 60 | Normal, Extended |
| 3 | 120 | Normal |
| 4 | 240 | Normal |

In the case of a normal CP, when an index of a numerology is expressed by $\mu$, the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 8

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot $N^{slot}_{symb}$, the number of slots per frame Nframe,µslot, and the number of slots per subframe Nsubframe,µslot are expressed as shown in the following table.

TABLE 9

| M | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 10

| For-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | X | U | U |
| 32 | D | D | D | D | D | D | D | D | D | X | X | X | U | U |
| 33 | D | D | D | D | D | D | D | D | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | U | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | X | X | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | D | D | D | D | D | D | D | D | X |
| 47 | D | D | D | D | X | D | D | D | D | D | D | D | X | X |
| 48 | D | D | X | X | X | D | D | X | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U | U |

TABLE 10-continued

| For-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

<SS Block in NR>

In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

FIG. 4 is an exemplary diagram illustrating an example of an SS block in NR.

Referring to FIG. 4, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 5.

FIG. 5 is an exemplary diagram illustrating an example of beam sweeping in NR.

The base station transmits each SS block in the SS burst with beam sweeping over time. At this time, the SS blocks in the SS burst set are transmitted in order to support UEs existing in different directions. In FIG. 5, the SS burst set includes SS blocks 1 to 6, and each SS burst includes two SS blocks.

<Disclosure of the Present Disclosure>

Hereinafter, the disclosure of the present specification proposes ways to reduce cross link interference (CLI) in a 5G NR networks supporting flexible duplex.

In the case of 5G NR networks, Time Division Duplex (TDD) and Frequency Division Duplex (FDD) can be used in the range of operation band FR1 (e.g., 6 GHz or lower) and TDD can be used in the range of operation band FR2 (e.g., 6 GHz or higher).

In the case of TDD, a ratio of DL to UL can beset differently by changing a DL/UL configuration in response to the amount of traffic. However, when the same frequency band or a neighboring frequency band is used, a serving cell and a neighboring cell (or including a case in which a serving cell provider differs from a neighboring cell provider) may use the same DL/UL configuration in order to minimize the influence of interference. In this case, DL/UL configuration flexibility decreases.

In the case of FDD, since a DL/UL ratio cannot be changed irrespective of the amount of DL/UL traffic, radio resources cannot be utilized.

In order to increase system capacity, a way to dynamically change a DL/UL ratio based on the amount of traffic has been researched.

Figure 6:
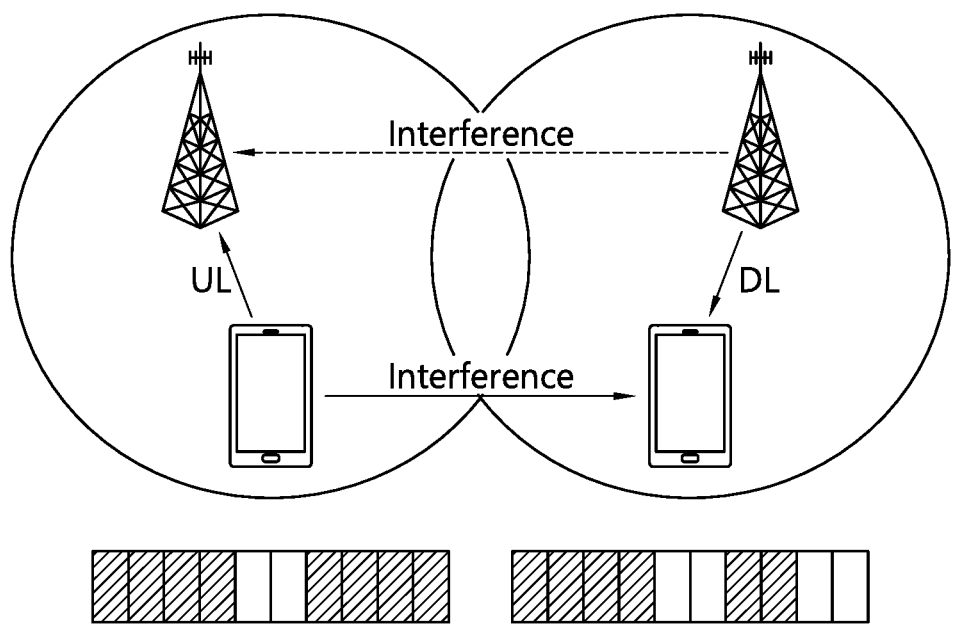
FIG. 6 illustrates an example of interference due to flexible duplex.

FIG. 6 illustrates an example of interference due to flexible duplex.

As shown in FIG. 6, a DL/UL ratio is dynamically changed based on the amount of traffic of each cell. However, the dynamic change may increase interference between UEs or base stations may occur cells.

To solve this problem, each cell takes amount of cross link interference (CLI) into consideration to flexibly change a UL/DL ratio. Also, in order to flexibly change a UL/DL configuration, techniques for mitigating interference caused by a difference between a UL/DL configuration of a serving cell and a UL/DL configuration of a neighboring cell are required.

One technique to achieve flexible change of a UL/DL is to measure cross link interference (CLI). That is, when a base station uses flexible duplex for each cell, a first UE of a serving cell can measure interference from a second UE of an interfering cell. When the level of the measured interference is high, the base station can stop use of flexible duplex and control UL/DL configurations such that a UL/DL configuration of a neighboring cell corresponds to a UL/DL configuration of the serving cell or control interference through power control.

To measure a CLI, the first UE of the serving cell monitors a reference signal (referred to as a CLI-RS in the present specification) transmitted from the second UE of the neighboring cell at predetermined intervals and reports a measurement value with respect to the CLI-RS to the corresponding network. The CLI-RS may be transmitted using an existing sounding reference signal (SRS) or a newly defined CSI-RS.

If a UE measures interference with respect to a signal from another UE belonging to a neighboring cell and transmits the measured interference to a serving cell to consider interference from the neighboring cell, the serving cell may determine the ratios and the order of UL and DL. To measure the interference, a UE of the serving cell may measure SRS transmitted by a UE of the neighboring cell.

However, considering a case where the serving cell transmits a downlink signal in a DL timing to the UE and the neighboring cell receives an uplink signal from a neighboring UE in a UL timing, the UE's reception of the downlink signal is interfered with the uplink signal from the neighboring UE. In this case, coordination is not possible between the UE and the neighboring UE, the neighboring cell has to adjust transmission power of the neighboring UE.

As above explained, with only the coordination between the serving cell and the neighboring cells, it is difficult to reduce impacts of interferences. Therefore, a new mechanism is needed to avoid interference effects. The present disclosure discloses a technique for dynamically setting the transmission power of a terminal for a case where UL/DL is dynamically changed. That is, the transmission power of the UE should be dynamically determined according to the network environment (e.x., interference environment, cell type, etc.). The technique as proposed disclosure can improve system performance.

Figure 7:
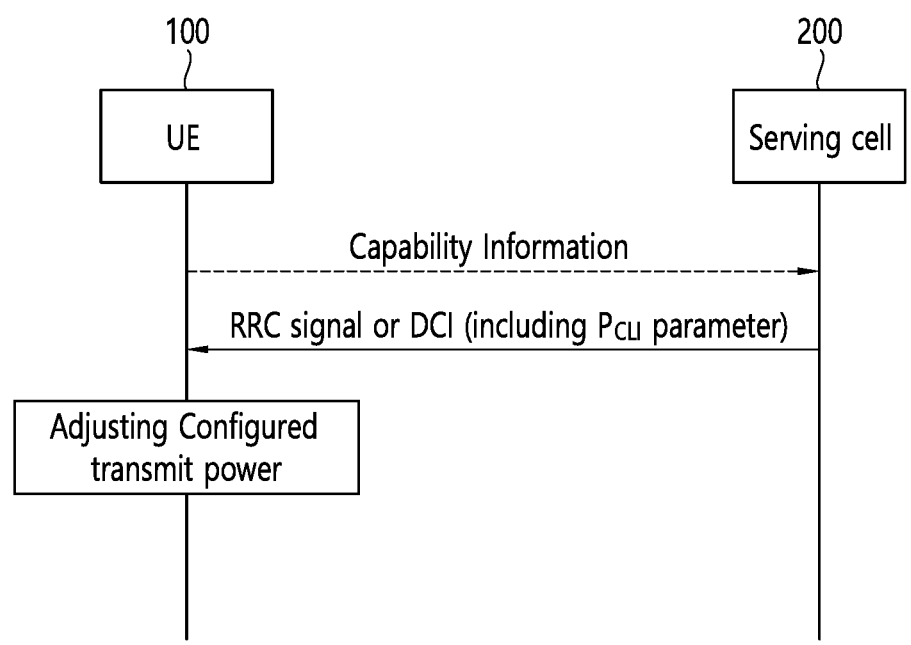
FIG. 7 illustrates an exemplary signal flow according to the present disclosure.

FIG. 7 illustrates an exemplary signal flow according to the present disclosure.

The UE may be improved to transmit, to the cell (e.g., serving cell), UE capability information including information on whether the UE can apply a parameter for an additional reduction value (e.g., $P_{CLI}$) to determine a transmit power.

The transmission of the UE capability information may be skipped.

The information may be expressed as Txpowermanagement in the below table.

TABLE 11

| CLI-ParameterNR ::= | SEQUENCE { |
| Txpowermanagement OPTIONAL | ENUMERATED {supported} |
| } | |

A serving cell (or a serving base station) may be improved to transmit the parameter for $P_{CLI}$ to the UE. The parameter for the $P_{CLI}$ may be transferred through an RRC signal or DCI. An unit of the $P_{CLI}$ is dB and can be set, for example, from 0 dB to 1 dB or 2 dB step size. The parameter for $P_{CLI}$ may be determined based on a strength of the CLI. The strength of the CLI may be measured and reported by one or more UEs.

For example, $P_{CLI}=[0, 1, 2, x-1]$ or $P_{CLI}=[0, 2, 4, y-2]$ (x, y: maximum power reduction value)

If the UE receives the parameter for the additional transmission power reduction value (e.g., $P_{CLI}$), the UE determines the transmission power based on the parameter for the $P_{CLI}$.

In more detail, the UE determines a range of configured TX power based on below Equations and then determines the transmission power (e.g., $P_{CMAX,f,c}$) in the determined range such that the transmission power can be reduced.

<FR1 Configured Transmitted Power for Operating Dynamic TDD>

For dynamic TDD in FR1, the range of configured TX power may be determined based on the below Equation 1.

$P_{CMAX\_L,f,c} \leq P_{CMAX,f,c} \leq P_{CMAX\_H,f,c}$ with $P_{CMAX\_L,f,c} = \text{MIN}\{P_{EMAX,c} - \Delta T_{C,c}, (P_{PowerClass} - \Delta P_{PowerClass}) - \text{MAX}(MPR_c + A - MPR_c + \Delta T_{IB,c} + \Delta T_{C,c} + \Delta T_{RxSRS}, P - MPR_c)\}$ $P_{CMAX\_H,f,c} = \text{MIN}\{P_{EMAX,c}, P_{PowerClass} - \Delta P_{PowerClass}\}$ [Equation 1]

Here, $P_{EMAX}$ is a maximum allowed UE output power signalled by higher layers.

$P_{EMAX,c}$ is a maximum allowed UE output power signalled by higher layers for serving cell c.

$P_{PowerClass}$ is a nominal UE power (i.e., no tolerance).

$\Delta P_{PowerClass}$ is an adjustment to maximum output power for a given power class $MPR_c$ is a maximum power reduction for serving cell c.

$A\text{-}MPR_c$ is an additional Maximum Power Reduction for serving cell c.

$\Delta T_{C,c}$ is an allowed operating band edge transmission power relaxation for serving cell c.

$\Delta T_C$ is an allowed operating band edge transmission power relaxation $\Delta T_{IB,c}$ is an allowed maximum configured output power relaxation due to support for inter-band CA operation and due to support for SUL operations, for serving cell c.

$\Delta T_{RxSRS}$ is applied when UE transmits SRS to other than first SRS port.

$P\text{-}MPR_c$ is the allowed maximum output power reduction for ensuring compliance with applicable electromagnetic energy absorption requirements.

$P_{CMAX\_L,f,c}$ and $P_{CMAX\_L,f,c}$ are determined according to the $P_{CLI}$ received from the cell. For determining $P_{CMAX\_L,f,c}$ and $P_{CMAX\_L,f,c}$, below four (4) cases may be considered.

1) if only an explicit low boundary is modified, below Equation 2 may be used.

$P_{CMAX\_L,f,c} \leq P_{CMAX,f,c} \leq P_{CMAX\_H,f,c}$ with $P_{CMAX\_L,f,c} = \text{MIN}\{P_{EMAX,c} - \Delta T_{C,c}, (P_{PowerClass} - \Delta P_{PowerClass}) - \text{MAX}(MPR_c + A - MPR_c + \Delta T_{IB,c} + \Delta T_{C,c} + \Delta T_{RxSRS}, P - MPR_c) - P_{CLI}\}$ $P_{CMAX\_H,f,c} = \text{MIN}\{P_{EMAX,c}, P_{PowerClass} - \Delta P_{PowerClass}\}$ [Equation 2]

2) If only an implicit low boundary is modified, below Equation 3 may be used.

$P_{CMAX\_L,f,c} \leq P_{CMAX,f,c} \leq P_{CMAX\_H,f,c}$ with $P_{CMAX\_L,f,c} = \text{MIN}\{P_{EMAX,c} - \Delta T_{C,c}(P_{PowerClass} - \Delta P_{PowerClass}) - \text{MAX}(MPR_c + A - MPR_c + \Delta T_{IB,c} + \Delta T_{C,c} + \Delta T_{RxSRS} + P_{CLI}, P - MPR_c)\}$ $P_{CMAX\_H,f,c} = \text{MIN}\{P_{EMAX,c}, P_{PowerClass} - \Delta P_{PowerClass}\}$ [Equation 3]

3) If both of explicit low boundary and upper boundary are modified, below Equation 4 may be used.

$P_{CMAX\_L,f,c} \leq P_{CMAX,f,c} \leq P_{CMAX\_H,f,c}$ with $P_{CMAX\_L,f,c} = \text{MIN}\{P_{EMAX,c} - \Delta T_{C,c}(P_{PowerClass} - \Delta P_{PowerClass}) - \text{MAX}(MPR_c + A - MPR_c + \Delta T_{IB,c} + \Delta T_{C,c} + \Delta T_{RxSRS}, P - MPR_c) - P_{CLI}\}$ $P_{CMAX\_H,f,c} = \text{MIN}\{P_{EMAX,c}, P_{PowerClass} - \Delta P_{PowerClass} - P_{CLI}\}$ [Equation 4]

4) If both of implicit low boundary and upper boundary are modified, below Equation 5 may be used.

$P_{CMAX\_L,f,c} \leq P_{CMAX,f,c} \leq P_{CMAX\_H,f,c}$ with $P_{CMAX\_L,f,c} = \text{MIN}\{P_{EMAX,c} - \Delta T_{C,c}(P_{PowerClass} - \Delta P_{PowerClass}) - \text{MAX}(MPR_c + A - MPR_c + \Delta T_{IB,c} + \Delta T_{C,c} + \Delta T_{RxSRS} + P_{CLI}, P - MPR_c)\}$ $P_{CMAX\_H,f,c} = \text{MIN}\{P_{EMAX,c}, P_{PowerClass} - \Delta P_{PowerClass} - P_{CLI}\}$ [Equation 5]

<FR2 Configured Transmitted Power for Operating Dynamic TDD>

For dynamic TDD in FR2, the transmission power (e.g., $P_{UMAX,f,c}$) is determined in the range of configured TX power as below Equation 6.

$P_{Powerclass} - \text{MAX}(MPR_{f,c} + \Delta MB_{P,n}, P - MPR_{f,c}) - \text{MAX}\{T(MPR_{f,c}), T(P - MPR_{f,c})\} \leq P_{UMAX,f,c} \leq EIRP_{max}$ [Equation 6]

$P_{CMAX\_L,f,c}$ is determined according to the $P_{CLI}$ received from the cell.

$P_{Powerclass} - \text{MAX}(MPR_{f,c} + \Delta MB_{P,n} + P_{CLI}, P - MPR_{f,c}) - \text{MAX}\{T(MPR_{f,c}), T(P - MPR_{f,c})\} \leq P_{UMAX,f,c} \leq EIRP_{max}$ [Equation 7]

$P_{Powerclass} - \text{MAX}(MPR_{f,c} + \Delta MB_{P,n}, P - MPR_{f,c}) - P_{CLI} - \text{MAX}\{T(MPR_{f,c}), T(P - MPR_{f,c})\} \leq P_{UMAX,f,c} \leq EIRP_{max}$ [Equation 8]

Figure 8:
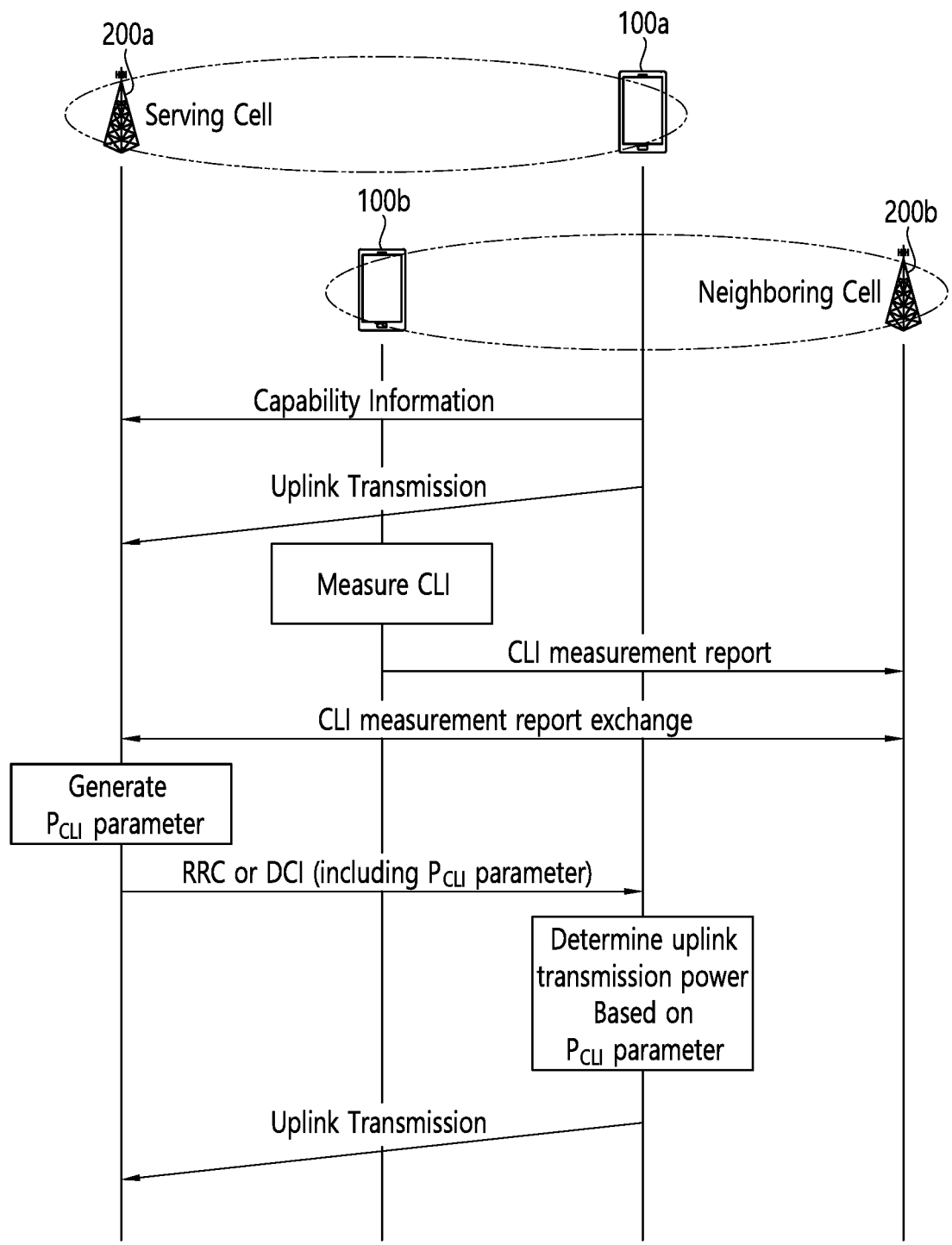
FIG. 8 illustrates another exemplary signal flow according to the present disclosure.

FIG. 8 illustrates another exemplary signal flow according to the present disclosure.

Referring to FIG. 8, a serving cell 200a serves a first UE 100a and a neighboring cell 200b serves a second UE 100b.

The first UE 100a transmits capability information including information on whether the UE can apply a parameter for an additional reduction value (e.g., $P_{CLI}$) to determine a transmit power.

Meanwhile, the first UE 100a performs an uplink transmission. The uplink transmission may include a transmission of a PUCCH signal, a transmission of a PUSCH signal, a transmission of PRACH and a transmission of reference signals.

The second UE 100b measures CLI caused by the uplink transmission of the first UE 100a and transmits a CLI measurement report to the neighboring cell 200b.

The neighboring cell 200b exchanges the CLI measurement report with the serving cell 200a.

The serving cell 200a generates the additional reduction value (e.g., $P_{CLI}$) based on the CLI measurement report received from the neighboring cell 200b.

The serving cell 200a transmits an RRC signal and/or DCI including the additional reduction value (e.g., $P_{CLI}$) to the first UE 100a.

The first UE 100a determines a transmission power based on the additional reduction value (e.g., $P_{CLI}$).

The first UE 100a performs the uplink transmission based on the determined transmission power.

<Communication System to which the Disclosure of this Specification is to be Applied>

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 9:
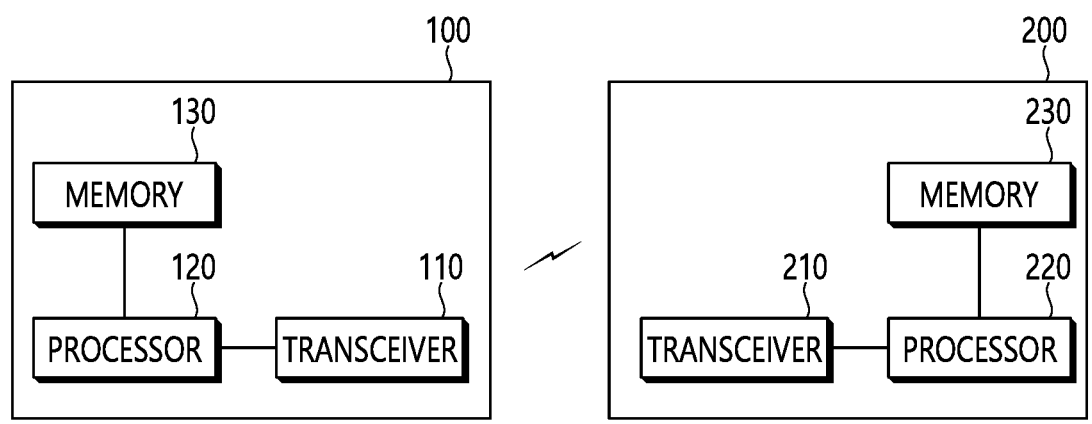
FIG. 9 is a block diagram illustrating a wireless device and a base station, by which the disclosure of this specification can be implemented.

FIG. 9 is a block diagram illustrating a wireless device and a base station, by which the disclosure of this specification can be implemented.

Referring to FIG. 9, a wireless device 100 and a base station 200 may implement the disclosure of this specification.

The wireless device 100 includes a processor 120, a memory 130, and a transceiver 110. Likewise, the base station 200 includes a processor 220, a memory 230, and a transceiver 210. The processors 120 and 220, the memories 130 and 230, and the transceivers 110 and 210 may be implemented as separate chips, or at least two or more blocks/functions may be implemented through one chip.

Each of the transceivers 110 and 210 includes a transmitter and a receiver. When a particular operation is performed, either or both of the transmitter and the receiver may operate. Each of the transceivers 110 and 210 may include one or more antennas for transmitting and/or receiving a radio signal. In addition, each of the transceivers 110 and 210 may include an amplifier configured for amplifying a Rx signal and/or a Tx signal, and a band pass filter for transmitting a signal to a particular frequency band.

Each of the processors 120 and 220 may implement functions, procedures, and/or methods proposed in this specification. Each of the processors 120 and 220 may include an encoder and a decoder. For example, each of the processors 120 and 230 may perform operations described above. Each of the processors 120 and 220 may include an application-specific integrated circuit (ASIC), a different chipset, a logic circuit, a data processing device, and/or a converter which converts a base band signal and a radio signal into each other.

Each of the memories 130 and 230 may include a Read-Only Memory (ROM), a Random Access Memory (RAM), a flash memory, a memory card, a storage medium, and/or any other storage device.

Figure 10:
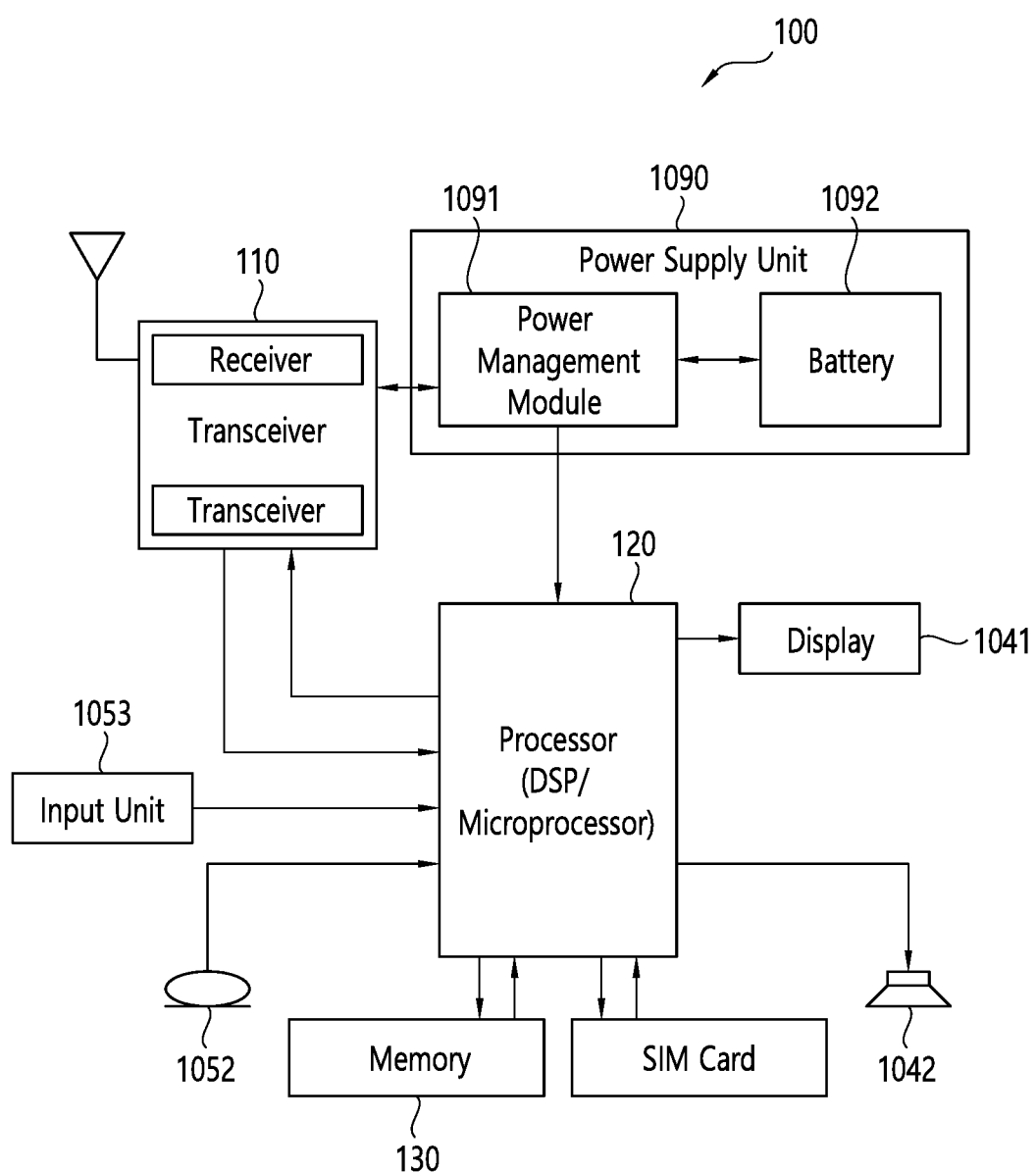
FIG. 10 is a block diagram showing a detail structure of the wireless device shown in FIG. 9.

FIG. 10 is a block diagram showing a detail structure of the wireless device shown in FIG. 9.

In particular, FIG. 10 shows an example of the wireless device of FIG. 9 in greater detail.

A wireless device includes a memory 130, a processor 120, a transceiver 110, a power management module 1091, a battery 1092, a display 1041, an input unit 1053, a speaker 1042, a microphone 1052, a subscriber identification module (SIM) card, and one or more antennas.

The processor 120 may be configured to implement the proposed functions, procedures, and/or methods described in the present specification. Layers of a radio interface protocol may be implemented in the processor 120. The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 120 and/or the transceiver 110. The battery 1092 supplies power to the power management module 1091. The display 1041 outputs a result processed by the processor 120. The input unit 1053 receives an input to be used by the processor 120. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 130 is operatively coupled to the processor 120, and stores a variety of information for operating the processor 120. The memory 130 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 130 and may be performed by the processor 120. The memory 130 may be implemented inside the processor 120. Alternatively, the memory 130 may be implemented outside the processor 120, and may be coupled to the processor 120 in a communicable manner by using various well-known means.

The transceiver 110 is operatively coupled to the processor 120, and transmits and/or receives a radio signal. The transceiver 110 includes a transmitter and a receiver. The transceiver 110 may include a baseband signal for processing a radio frequency signal. The transceiver controls one or more antennas to transmit and/or receive a radio signal. In order to initiate communication, the processor 120 transfers command information to the transceiver 110, for example, to transmit a radio signal constituting voice communication data. The antenna serves to transmit and receive a radio signal. When the radio signal is received, the transceiver 110 may transfer a signal to be processed by the processor 120, and may convert the signal into a baseband signal. The processed signal may be converted into audible or readable information which is output through the speaker 1042.

The speaker 1042 outputs a result related to a sound processed by the processor 120. The microphone 1052 receives a sound-related input to be used by the processor 120.

A user presses (or touches) a button of the input unit 1053 or drives voice (activates voice) by using the microphone 1052 to input command information such as a phone number or the like. The processor 120 receives the command information, and performs a proper function such as calling the phone number or the like. Operational data may be extracted from the SIM card or the memory 130. In addition, the processor 120 may display command information or operational information on the display 1041 for user's recognition and convenience.

Figure 11:
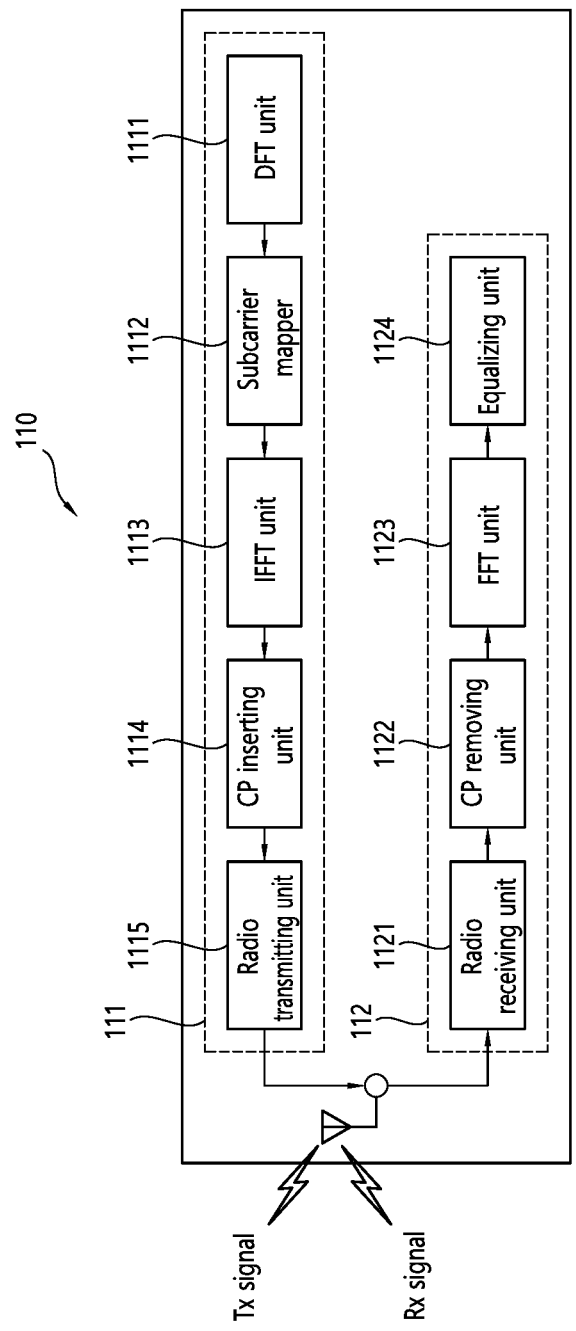
FIG. 11 is a detailed block diagram illustrating a transceiver of the wireless device shown in FIG. 9 and FIG. 10.

FIG. 11 is a detailed block diagram illustrating a transceiver of the wireless device shown in FIG. 9 and FIG. 10.

Referring to FIG. 11, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

Figure 12:
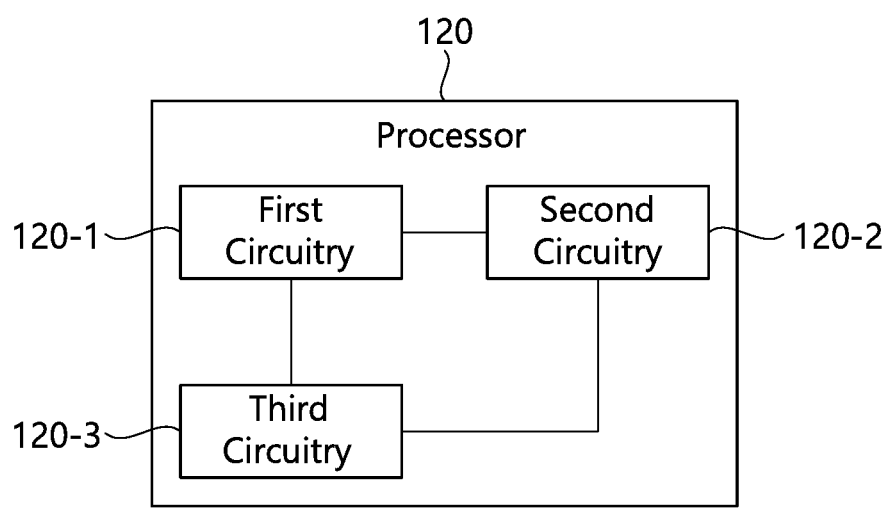
FIG. 12 illustrates a detailed block diagram illustrating a processor of the wireless device shown in FIG. 9 and FIG. 10.

FIG. 12 illustrates a detailed block diagram illustrating a processor of the wireless device shown in FIG. 9 and FIG. 10.

Referring to FIG. 12, the processor 120 as illustrated in FIG. 9 and FIG. 10 may comprise a plurality of circuitries such as. a first circuitry 120-1, a second circuitry 120-2 and a third circuitry 120-3.

The plurality of circuitries may be configured to implement the proposed functions, procedures, and/or methods described in the present specification.

The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 13:
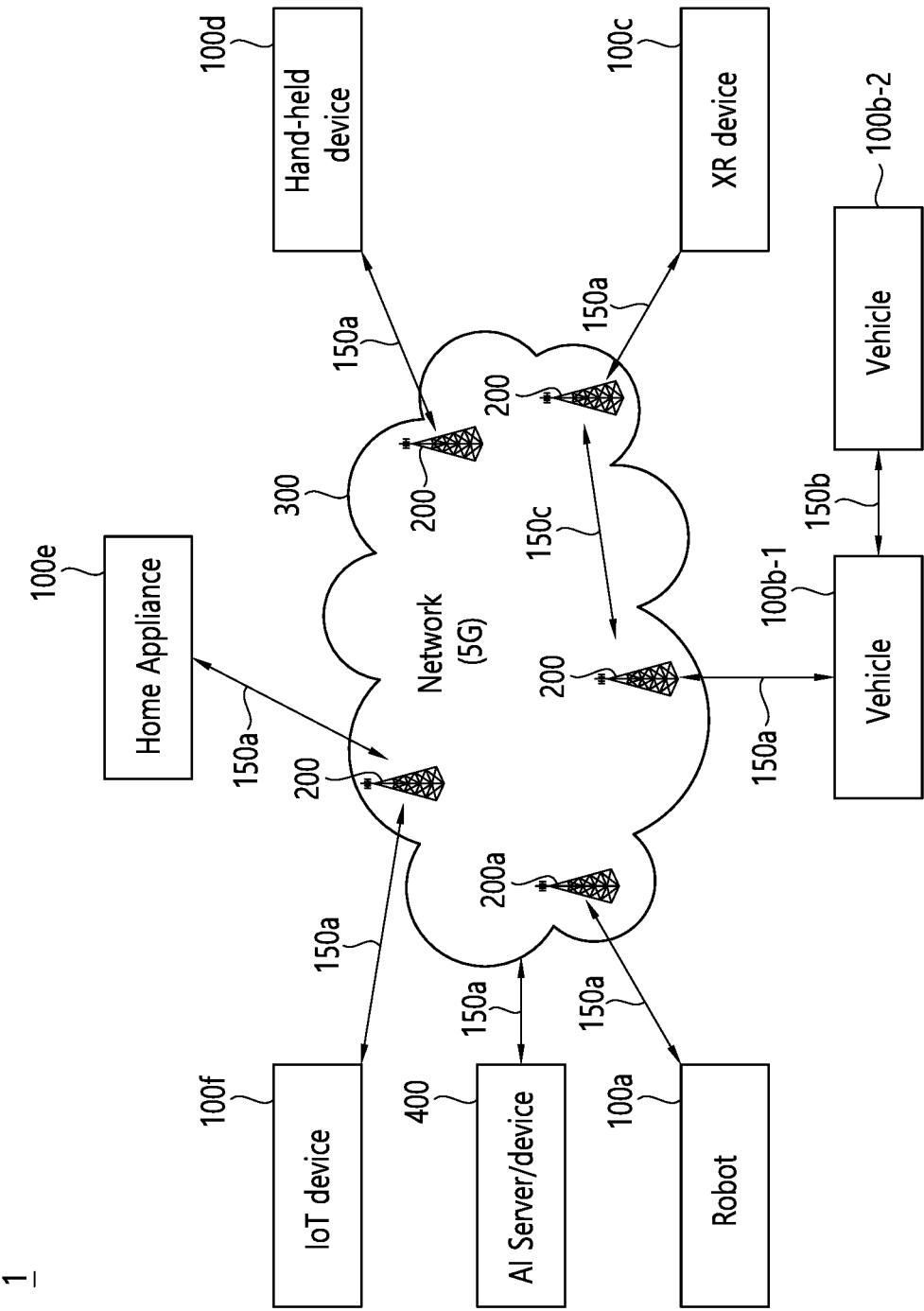
FIG. 13 illustrates a communication system that can be applied to the present specification.

FIG. 13 illustrates a communication system that can be applied to the present specification.

Referring to FIG. 13, a communication system applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300.

The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like.

The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for determining an uplink transmit power, the method performed by a user equipment (UE) and comprising:
   receiving information on an additional reduction value for an uplink transmission power; and
   determining the uplink transmit power based on the additional reduction value,
   wherein the additional reduction value is used to reduce a cross link interference (CLI),
   wherein the uplink transmit power is determined within a lower bound and an upper bound, and
   wherein based on that the uplink transmission is performed in a frequency range 1 (FR1) for 5G, the additional reduction value is applied to one or both of the lower bound and the upper bound.

2. The method of claim 1, further comprising:
   transmitting capability information representing whether the UE is capable of applying the additional reduction value to determine the uplink transmit power.

3. The method of claim 1, further comprising:
   measuring the CLI which is caused by adjacent UEs served by a neighboring cell; and
   transmitting a measurement report including information on the measured CLI.

4. The method of claim 1, wherein the information on the additional reduction value is received via a radio resource control (RRC) signal or downlink control information (DCI).

5. A method for controlling an uplink transmit power, the method performed by a base station and comprising:

transmitting, to a user equipment (UE), information on an additional reduction value for an uplink transmission power of the UE, wherein the additional reduction value is used for the UE to determine the uplink transmit power thereby reducing a cross link interference (CLI), wherein the uplink transmit power is within a lower bound and an upper bound, and wherein based on that the uplink transmission is performed in a frequency range 1 (FR1) for 5G, the additional reduction value is applied to one or both of the lower bound and the upper bound.

6. The method of claim 5, further comprising:
receiving capability information representing whether the UE is capable of applying the additional reduction value to determine the uplink transmit power.

7. The method of claim 5, further comprising:
receiving information on a CLI from a neighboring cell; and
determining the additional reduction value, based on the information on the CLI.

8. The method of claim 1, wherein the information on the additional reduction value is transmitted via a radio resource control (RRC) signal or downlink control information (DCI).

9. A user equipment (UE) for determining an uplink transmit power, the UE comprising:
at least one processor; and
at least one computer memory operably connectable to the at least one processor and storing instructions that, when executed by the at least one processor, perform operations comprising:

receiving information on an additional reduction value for an uplink transmission power; and determining the uplink transmit power based on the additional reduction value, wherein the additional reduction value is used to reduce a cross link interference (CLI), wherein the uplink transmit power is determined within a lower bound and an upper bound, and wherein based on that the uplink transmission is performed in a frequency range 1 (FR1) for 5G, the additional reduction value is applied to one or both of the lower bound and the upper bound.

10. The UE of claim 9, wherein the operations further comprise:
transmitting capability information representing whether the UE is capable of applying the additional reduction value to determine the uplink transmit power.

11. The UE of claim 9, wherein the operations further comprise:
measuring the CLI which is caused by adjacent UEs served by a neighboring cell; and
transmitting a measurement report including information on the measured CLI.

12. The UE of claim 9, wherein the information on the additional reduction value is received via a radio resource control (RRC) signal or downlink control information (DCI).

* * * * *